C. Parks,
Insect Trap.

No. 110,996.  Patented Jan. 17, 1871.

UNITED STATES PATENT OFFICE.

CAROLINE PARKS, OF MILAN, OHIO.

IMPROVEMENT IN TREE-PROTECTORS.

Specification forming part of Letters Patent No. 110,996, dated January 17, 1871.

*To all whom it may concern:*

Be it known that I, CAROLINE PARKS, of Milan, in the county of Erie, State of Ohio, have invented certain new and useful Improvements in Insect-Trap or Tree-Protector, of which the following is a full and complete description, reference being had to the accompanying drawing, making a part of this specification, in which—

Figure 1:
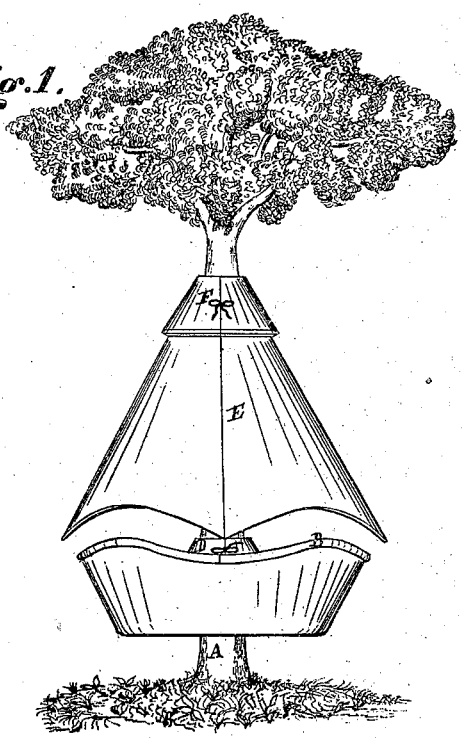
Figure 2:
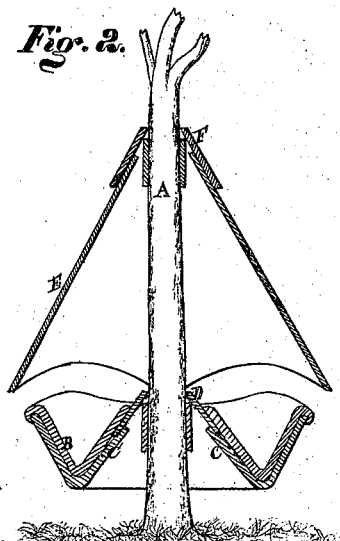

Figure 1 is a side view of the trap attached to a tree. Fig. 2 is a transverse vertical section.

Like letters of reference refer to like parts in the several views.

The nature of this invention relates to the composition and construction of an insect-trap for the protection of trees, consisting of a dish composed of plaster-of-paris, glue, and leather, or other flexible substance, whereby is produced a cheap, strong, and impervious vessel or dish for holding coal-oil, liquid tar, or other liquid material offensive and destructive to insect life, and which dish and its contents are protected from the sun and rain by a hood or canopy, as hereinafter more fully described.

In the drawing, Fig. 1, A represents a tree, to the stock or body of which is secured a dish, B. The outside of the dish is formed of leather or other flexible material, and, after having been secured to the trunk of the tree, as hereinafter stated, is coated upon the inside with plaster-of-paris, in which is compounded a certain quantity of glue or flaxseed-meal, whereby the plaster is rendered of greater tenacity and more retentive of oil or other like liquids destructive to insect life.

To render the dish still more impervious to the action of coal-oil, &c., the inside is coated with a composition of glue, resin, and flaxseed-meal, which also adds to the strength of the dish. The outer side of said dish is covered with a shield of strong leather, C, which, as will be observed, passes around under the bottom of the dish, and partially up between it and the tree, to which it is secured by the intervention of an elastic collar, D, attached thereto.

The collar is secured to the tree by means of the string or wire *a*, which admits of the trap being easily and readily adjusted to any height above the ground.

The elasticity of the collar allows the tree to expand in its natural growth; hence no injury can be sustained by the tree in consequence of wearing the collar.

D, Fig. 1, is a canopy or hood, made of stout leather, and of the shape shown. Said hood is also secured to the tree by means of an elastic collar, E, which is made to fit on over the hood, as shown, and embrace the tree by its elastic force, which not only assists in securing it to the tree in a more permanent manner, but, by its elasticity, allows the tree to expand in the process of its growth, thereby doing no injury to it by restraining its enlargement.

The collar is attached to the tree by a string or wire, *b*, which admits of its easy and ready adjustment at any height above the dish.

The lower edge of the hood projects over the rim of the dish, thereby protecting it from the sun and rain, so that the contents of the dish are not wasted or injured by the direct heat of the sun, nor by the dissolving presence of the rain.

The practical use of this device is as follows: In the dish is put coal-oil, liquid tar, or other similar material offensive and destructive to insect life. The creatures, on ascending the tree, are unable to go farther than the dish without first crossing it in order to reach the tree, in their attempts to do which, they fall victims to the destroying influence of the contents of the dish, and are therefore prevented from injuring the tree, or rather the fruit thereon.

What I claim as my invention, and desire to secure by United States Letters Patent, is—

The herein-described tree-protector, having the base formed of some flexible material, and covered internally with the compound herein described, after having been placed around the tree, in the manner substantially as set forth.

CAROLINE PARKS.

Witnesses:
BENJN. EMMONS,
SARAH A. MARSH.